(12) United States Patent
Matthews et al.

(10) Patent No.: US 7,183,999 B2
(45) Date of Patent: Feb. 27, 2007

(54) METHODS AND SYSTEMS FOR A PORTABLE, INTERACTIVE DISPLAY DEVICE FOR USE WITH A COMPUTER

(75) Inventors: Joseph H. Matthews, Woodinville, WA (US); Richard W. Stoakley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 10/869,604

(22) Filed: Jun. 16, 2004

(65) Prior Publication Data

US 2004/0235532 A1 Nov. 25, 2004

Related U.S. Application Data

(63) Continuation of application No. 09/784,716, filed on Feb. 15, 2001, now Pat. No. 6,784,855.

(51) Int. Cl.
*G09G 5/00* (2006.01)
(52) U.S. Cl. .................... 345/1.1; 345/173; 345/156; 345/2; 345/1.3
(58) Field of Classification Search ............... 345/1.3, 345/156, 179, 2, 169, 905, 173, 1.1; 363/59; 709/227; 455/1, 63, 67.3, 517, 524; 701/33
See application file for complete search history.

(56) References Cited

U.S. PATENT DOCUMENTS 5,233,502 A   8/1993   Beatty et al.
5,606,365 A   2/1997   Maurinus et al.
5,740,801 A   4/1998   Branson
5,794,164 A   8/1998   Beckert et al.
5,835,366 A   11/1998  Pleso et al.
5,850,209 A   12/1998  Lemke et al.
5,867,406 A   2/1999   Yanagisawa
5,877,819 A   3/1999   Branson
5,926,364 A   7/1999   Karidis
5,940,771 A   8/1999   Gollnick et al.
5,950,110 A   9/1999   Hendrickson
6,006,243 A   12/1999  Karidis
6,009,363 A   12/1999  Beckert et al.

(Continued)

FOREIGN PATENT DOCUMENTS

DE         19642267         5/1998

(Continued)

OTHER PUBLICATIONS

"*Sony Announce Location Free TV*", Digital-Lifestyles.info, retrieved from http://digital-lifestyles.info/display_page.asp?section=platform&id=960 on Jul. 12, 2004 (3 pages).

(Continued)

*Primary Examiner*—Bipin Shalwala
*Assistant Examiner*—Prabodh Dharia
(74) *Attorney, Agent, or Firm*—Lee & Hayes, PLLC

(57) ABSTRACT

An interactive display device provides a user an interface to a host computer, allowing the user to interface with the host computer through capabilities of a wireless communications channel to the host, where the display device provides processing necessary to communicate with the host, run client side software, and provide security functions.

5 Claims, 6 Drawing Sheets

U.S. PATENT DOCUMENTS

| | | | |
|---|---|---|---|
| 6,044,131 A | 3/2000 | McEvoy et al. | |
| 6,085,247 A | 7/2000 | Parsons, Jr. et al. | |
| 6,175,789 B1 | 1/2001 | Beckert et al. | |
| 6,189,146 B1 | 2/2001 | Misra et al. | |
| 6,202,008 B1 | 3/2001 | Beckert et al. | |
| 6,256,671 B1 | 7/2001 | Strentzsch et al. | |
| 6,314,406 B1 | 11/2001 | O'Hagan et al. | |
| 6,340,957 B1 | 1/2002 | Adler et al. | |
| 6,446,208 B1 | 9/2002 | Gujar et al. | |
| 6,670,950 B1 * | 12/2003 | Chin et al. | 345/173 |
| 6,784,855 B2 * | 8/2004 | Matthews et al. | 345/1.1 |
| 6,864,891 B2 * | 3/2005 | Myers | 345/502 |
| 7,054,965 B2 * | 5/2006 | Bell et al. | 710/72 |
| 2006/0082518 A1 * | 4/2006 | Ram | 345/1.1 |

FOREIGN PATENT DOCUMENTS

| | | |
|---|---|---|
| DE | 19800778 | 7/1999 |
| DE | 20003469 U | 8/2000 |
| DE | 19949984 | 10/2000 |
| JP | 49-40435 A | 4/1974 |
| JP | 59-88735 A | 5/1984 |
| JP | 64-53214 A | 3/1989 |
| JP | 4-66643 U | 6/1992 |
| JP | 7-287624 A | 10/1995 |
| JP | 9-26919 A | 1/1997 |
| JP | 9-319558 A | 12/1997 |
| JP | 2000-78232 A | 3/2000 |
| JP | 2000-163171 A | 6/2000 |

OTHER PUBLICATIONS

"*Sony Airboard IDT-LF2*", retrieved from http://www.t3.co.uk/features/default.asp?pagetypeid=2&articleid=14957&subsectionid on Jul. 12, 2004. (2 pages).

* cited by examiner

METHODS AND SYSTEMS FOR A PORTABLE, INTERACTIVE DISPLAY DEVICE FOR USE WITH A COMPUTER

RELATED APPLICATIONS

This is a continuation of and claims priority to U.S. patent application Ser. No. 09/784,716 filed on Feb. 15, 2001, now U.S. Pat. No. 6,784,855 entitled "Methods and Systems For Portable, Interactive Display Device With A Computer" by inventors Joseph H. Matthews and Richard W. Stoakley.

TECHNICAL FIELD

The present invention relates generally to computer display devices, and, more particularly, to portable, interactive display devices that communicate wirelessly with a host computer.

BACKGROUND OF THE INVENTION

The ever increasing usefulness of the personal computer (PC) leads users to an ever increasing dependence upon its capabilities. Ironically, that dependence in turn highlights some shortcomings of the traditional, "location-based," model of computing. In that model, users come to a powerful, self-contained PC when they have computing tasks to perform. This model has long been accepted, but clearly preferable is a "user-based" model of computing, wherein computing power comes to the user whenever, and wherever, it is needed.

The proliferation of laptop computers, pocket PCs, and their ilk illustrates a first step toward user-based computing. Users carry computing power with them so that it is always available. Useful as they are, however, portable devices have not eliminated the fixed location PC. The fixed PC coffers greater levels of performance than do many portables. Also, many peripheral devices are best left in one place, whether because of their weight, such as in the case of high-quality printers and scanners, or because of their connection to inherently fixed resources, such as Internet access devices that use DSL, fiber optic, CATV, or other "tethered" communications media. Even if the functionality of these peripherals could be made portable, their power drain would exacerbate an already sore point with users of portable devices. Many users are also hard pressed to justify the expense of owning both fixed and portable versions of some devices, especially as the fixed devices stand idle while the user moves about.

Microsoft's "WINDOWS TERMINAL SERVICES" (WTS) takes another step toward user-based computing, a step beyond laptops. WTS leverages the power of a fixed location PC, making it serve as host for numerous client workstations. The workstations communicate with the host, and each workstation uses the computing power, storage, and other resources of the host to present a user with the experience of running a full PC. Thus, the host can be placed in a location best suited for connecting to its peripherals and to tethered data channels while the workstations are placed at locations more convenient to the users. The host can be always running so that when a user accesses a workstation, he is faced only with a minimal login delay rather than a full boot delay. Because the host supports multiple, simultaneous users, a family that needs another PC may purchase a relatively inexpensive workstation rather than a second full PC. Upgrade costs are reduced as they are localized to the host whose upgraded resources are then made available for use by all users via the client workstations.

However, a PC (or PC-like workstation) in every room does not satisfy a user when his desire is for computing portability, not just computing ubiquity. Portability is especially important when the user wants to use the services of the computer while he is doing something else. For example, he may read news from an Internet service while eating breakfast or may scan sports statistics while watching television. What is needed is a device that separates the parts of the PC that have some reason for staying fixed (either by inherent necessity or by economic desirability) from the parts of the PC that the user needs to access as he wanders. An ideal device would leverage the power and connectivity of the fixed PC while allowing the flexibility of movement and location of portable devices.

SUMMARY OF THE INVENTION

The above problems and shortcomings, and others, are addressed by the present invention, which can be understood by referring to the specification, drawings, and claims. The present invention is a portable, interactive display device that presents to a user the graphical user interface of a host computer. The host is separate from the display device and usually sits in a fixed location. The invention allows a user to carry with him as he roams about the full user interface capability of the host, limited only by the capabilities of a wireless communications channel to the host. Devices made according to the invention include a display screen along with any number of other user input and output peripherals such as a mouse, keyboard, pen and touch screen, speaker, camera, and the like. The host provides processing, storage, and access to its own peripheral devices. The display device need only provide the amount of processing necessary to communicate with the host, to run the client side of the hosting software, and to provide security functions. The host provides a docking station that accommodates the display device. When in the docking station, the display device continues to operate but communicates with the host through the docking station rather than through the wireless channel. This allows for a higher quality video connection. The docking station may provide power to run the display device and to recharge its batteries.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DESCRIPTION OF THE INVENTION

Figure 1:
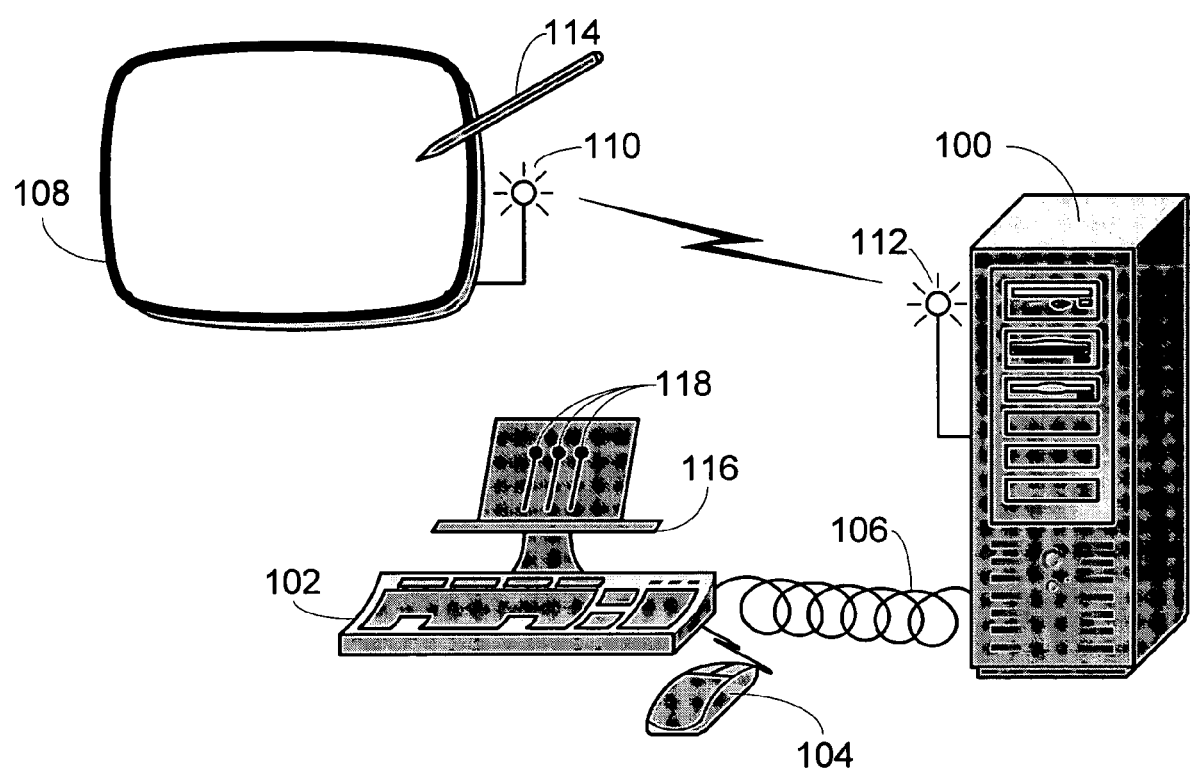
FIG. 1 is a schematic drawing of a portable, interactive display device in an exemplary environment.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The Portable, Interactive Display Device

The present invention is a portable, interactive display device that presents to a user the graphical user interface of a host computing device. An overview of the invention is presented with reference to FIG. 1, while details are presented later. FIG. 1 is a schematic drawing of the portable display device in an exemplary environment. The host computing device 100 is separate from the display device 108 and usually sits in a fixed location. The host may support any number of peripherals, here illustrated by a keyboard 102 and mouse 104 attached to the host by a wired communications channel 106. The display device 108 operates in two modes: tethered and untethered. When untethered, the display device communicates with the host via a wireless communications channel, here illustrated by a radio antenna 110 on the display device and an antenna 112 on the host. In the untethered mode, the user carries the display device around with him and the display device gives him access to the full user interface of the host. Of course, the untethered mode is limited by the bandwidth and range of the wireless communications channel. Accompanying the display device may be user input and output peripherals such as a mouse, keyboard, pen 114 for touch input, speaker, camera (402 in FIG. 4), and the like. The host provides processing to run applications, storage, and access to its own peripheral devices. The display device need only provide the amount of processing necessary to communicate with the host, to run the client side of the hosting software, and to provide security functions.

The host computing device 100 provides a docking station 116 that accommodates the display device 108. When in the docking station, the display device switches to tethered mode. In this mode, the display device operates as a display for the host and communicates with the host through connectors 118 on the docking station rather than through the wireless channel. This allows for a higher quality video connection. In FIG. 1, the docking station's connection to the host computer is by way of the wired communications channel 106. Other options are described below. The docking station may provide power to run the display device and to recharge its batteries.

Figure 2:
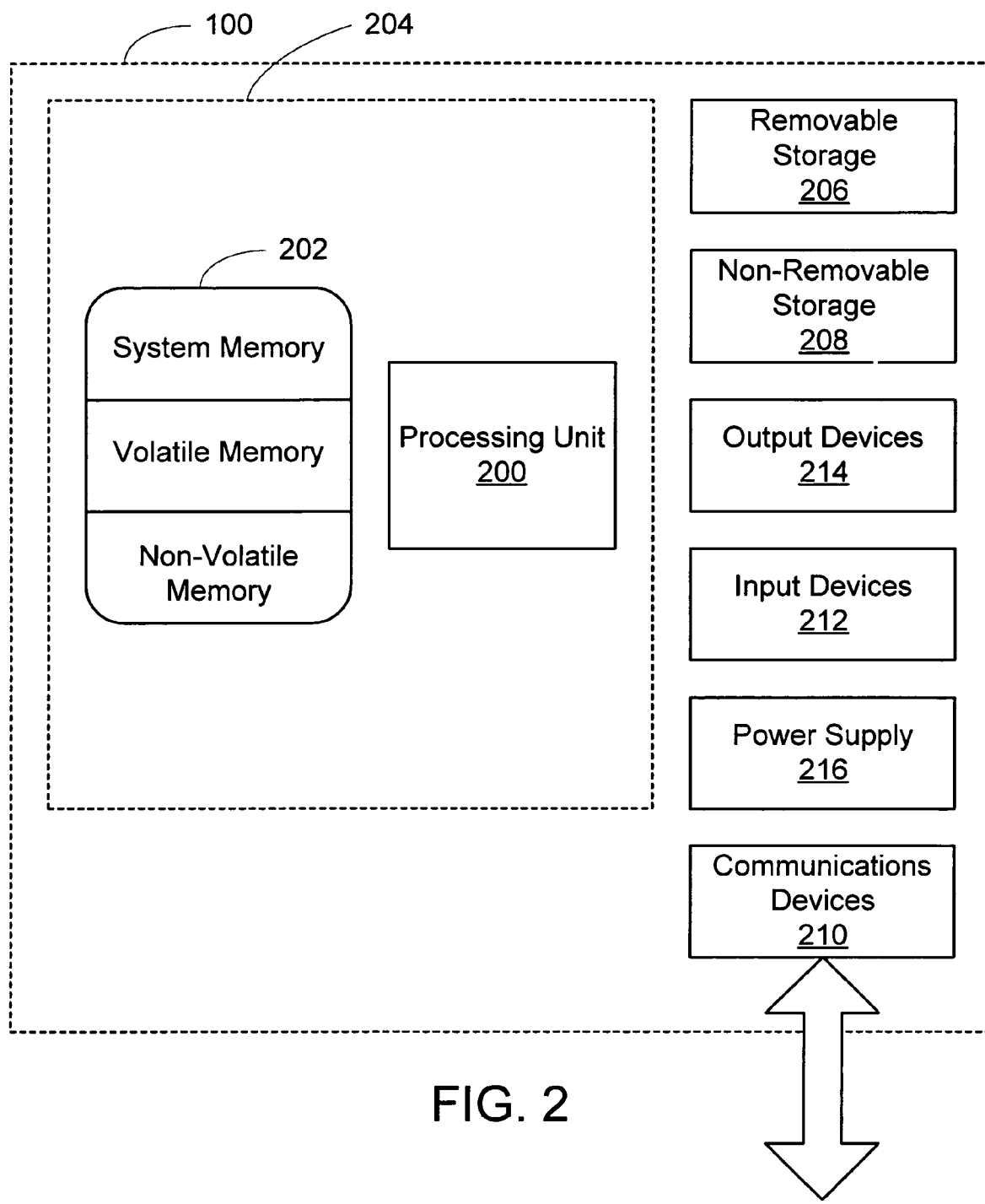
FIG. 2 is a structural diagram of an exemplary architecture usable for the host computing device and for the portable, interactive display device.

The host computing device 100 and portable display device 108 of FIG. 1 may be of any architecture. FIG. 2 is a structural diagram of an exemplary architecture usable for the host computing device and for the portable display device. The architecture portrayed is only one example of a suitable environment and is not intended to suggest any limitation as to the scope of use or functionality of the invention. Neither should the host computing device 100 or display device 108 be interpreted as having any dependency or requirement relating to any one or combination of components illustrated in FIG. 2. The invention is operational with numerous other general-purpose or special-purpose computing environments or configurations. Examples of well-known computing systems, environments, and configurations suitable for use with the invention include, but are not limited to, personal computers, servers, multiprocessor systems, microprocessor-based systems, minicomputers, mainframe computers, and distributed computing environments that include any of the above systems or devices. In their most basic configuration, the host and display devices typically include at least one processing unit 200 and memory 202. The memory 202 may be volatile (such as RAM), non-volatile (such as ROM, flash memory, etc.), or some combination of the two. This most basic configuration is illustrated in FIG. 2 by the dashed line 204. The host and display devices may have additional features and functionality. For example, they may include additional storage (removable and non-removable) including, but not limited to, PCMCIA cards, magnetic and optical disks, and magnetic tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by devices 100 and 108. The host device 100 may also contain communications channels 210 that allow the host to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections (such as the wired communications channel 106 in FIG. 1), and wireless media such as acoustic, radio, infrared, and other wireless media. The term computer-readable media as used herein includes both storage media and communications media. The host 100 and display devices 108 may also have input devices 212 such as a keyboard 102, mouse 104, pen 114, a voice-input device, a touch-input device, etc. Output devices 214 include the devices themselves, such as a screen display, speakers, printer, etc., and rendering modules (often called "adapters") for driving these devices. All these devices are well know in the art and need not be discussed at length here. The devices each have a power supply 216. On the display device 108, the power supply includes a battery and may include circuitry for recharging the battery whenever the display device is in the docking station 116.

Functionality in Untethered Mode: Display Device and Host

Figure 3:
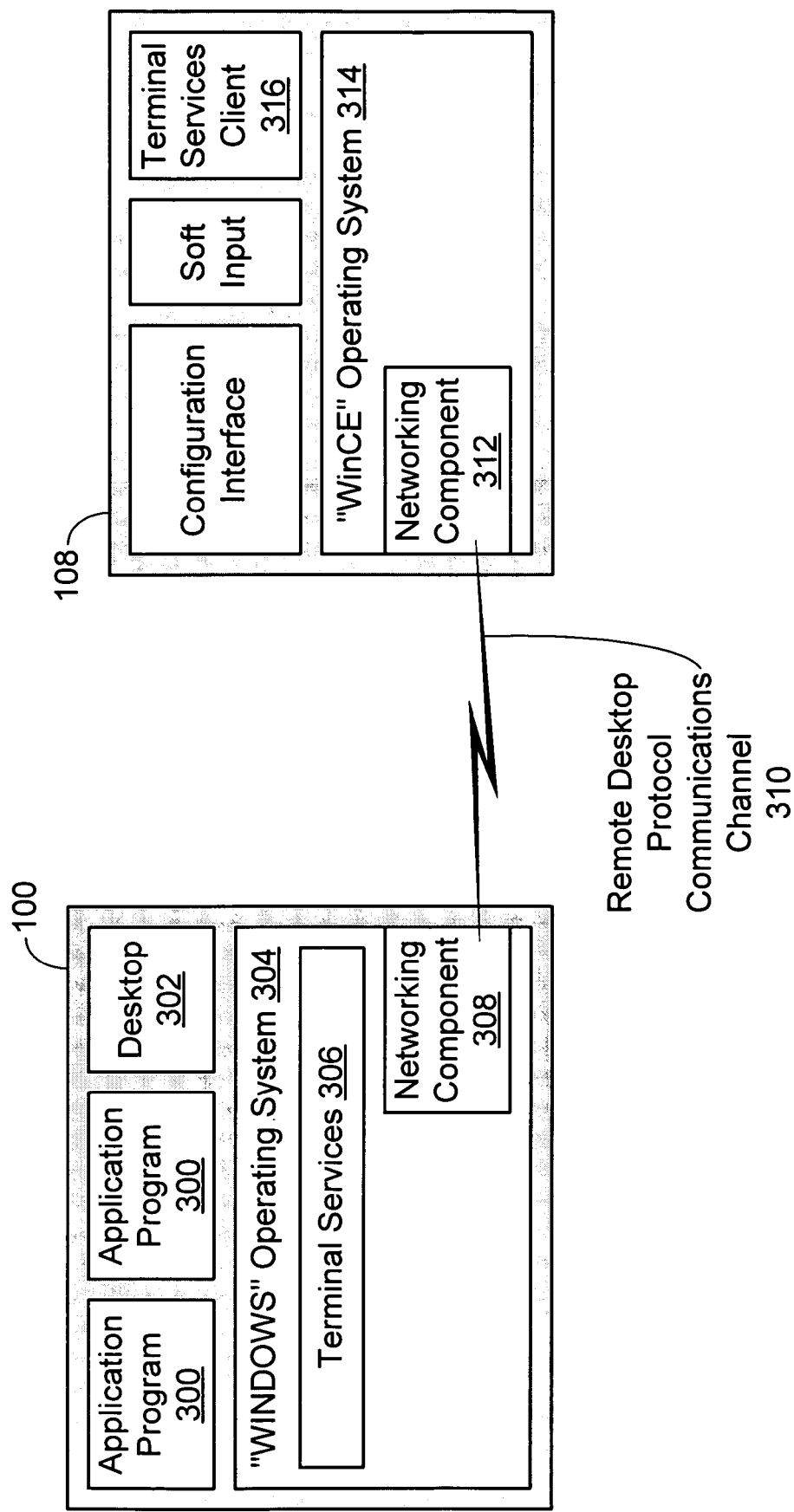
FIG. 3 is a block diagram showing how "WINDOWS TERMINAL SERVICES" software supports the invention.

When operating in untethered mode, the portable, interactive display device is supported by software that projects the user interface of the host computing device to the display device. The software also accepts user input from the display device and sends it to the host. As an example of this software, FIG. 3 is a block diagram of Microsoft's "WINDOWS TERMINAL SERVICES" (WTS). An application program 300 running on the host 100 sends its output to the operating system 304 intending the output to be displayed in one or more windows managed by the Desktop 302. If the user of the application program is using a portable display device 108, however, the Terminal Services software component 306 intercepts the display output, reformats it, and delivers it to the Networking software component 308 for transport to the display device.

Figure 4:
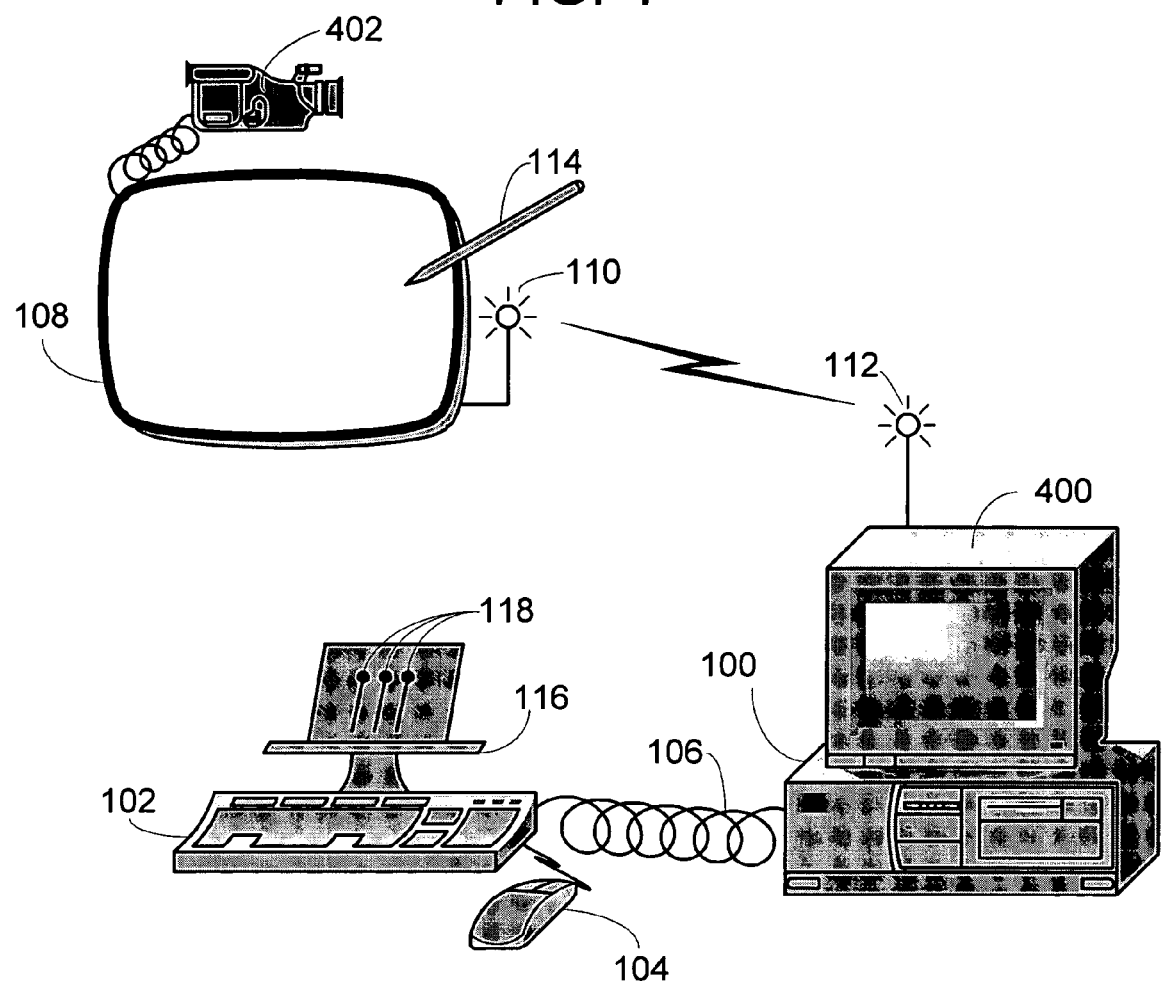
FIG. 4 is a schematic drawing showing possible configuration variations when the portable, interactive display device operates in the untethered mode.

The display information is transported to the portable display device 108 by a standard protocol such as Microsoft's Remote Desktop Protocol 310 or the Independent Computing Architecture protocol. These protocols allocate the limited bandwidth of the wireless communications channel, an especially important consideration when a bandwidth-intensive peripheral, such as the camera 402 in FIG. 4, is attached to the portable display device.

When the display information reaches the Networking component 312 on the portable display device 108, it is passed to the Terminal Services Client component 316. That component interprets the information and displays it on the display device's screen. If the display device is associated with a user input device, such as the pen 114 or the camera 402, then this procedure is reversed and the input from the device is presented to the Application Program 300 as if it were generated locally on the host 100.

The support software handles issues such as user authentication, encryption of data carried on the wireless communications channel, and application program licensing. For a discussion of licensing issues, see U.S. Pat. No. 6,189,146, "System and Method for Software Licensing," incorporated herein by reference. Software on the display device 108 stores configuration parameters and login credentials of its users. If wireless communications are interrupted during a user session, the display device uses the cached user credentials to automatically relogin when the host again comes within range.

Note that FIG. 3 is for illustrative purposes only, and the invention is not limited to the specific software components and protocols shown. In particular, one advantage of the invention is that the display device may run an operating system entirely different from that of the host. The standard display protocol hides implementation differences. The protocols and transport methods used to carry the display information are chosen to suit particular needs. For example, protocols TCP/IP, SPX, IPX, and NetBEUI may each be appropriate in certain situations. Appropriate transport methods include infrared and short-range radio such as Bluetooth, IEEE's 802.11b, and IEEE 1394 Firewire.

The host computing device 100 may run WTS in either single-user or multi-user mode. For a discussion of the issues involved in the multi-user mode, see U.S. Pat. No. 6,085,247, "Server Operating System for Supporting Multiple Client-Server Sessions and Dynamic Reconnection of Users to Previous Sessions Using Different Computers," incorporated herein by reference. When in single-user mode, the host supports only one user session. If a user is using an untethered display device 108, then the host sends no display output to its locally attached display 400 (if any), thus darkening its screen. The host also ignores input from local peripherals such as the keyboard 102 and mouse 104. On the other hand, a host running in multi-user mode supports multiple, live, and concurrent user sessions. The user of an untethered display device is just one of potentially several users. Each display device, untethered, tethered, or locally attached as 400, operates independently to present its user with the full capabilities of a host session.

Functionality in Tethered Mode: The Docking Station

Figure 5:
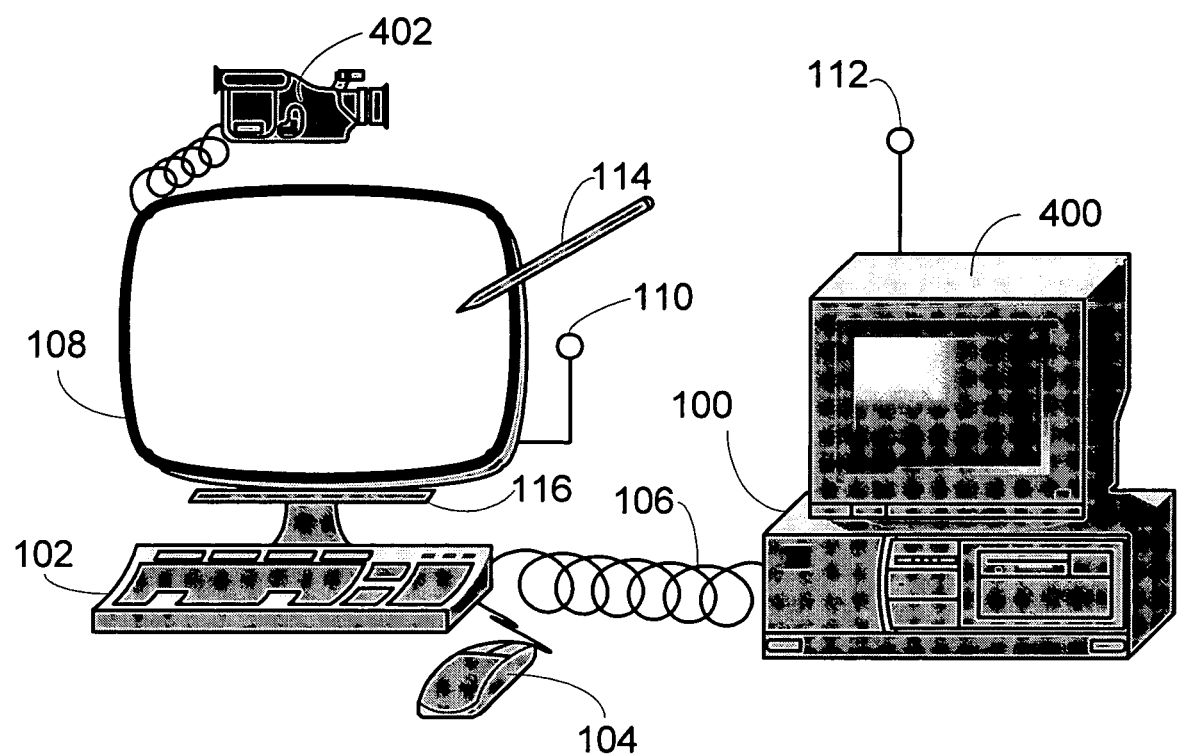
FIG. 5 is a schematic drawing showing a portable, interactive display device sitting in a docking station and operating in tethered mode.

FIG. 5 shows the portable, interactive display device 108 sitting in its docking station 116 and operating in the tethered mode. The wireless connection illustrated in FIG. 1 is silent in this mode. Communications from the host computing device 100 are carried over the wired channel 106 to the docking station and then through the connectors 118 (shown in FIG. 1) to the display device. In some embodiments, these connectors carry display signals (such as VGA signals) directly to the display device without mediation of an intervening data protocol. This direct connection provides a higher quality video signal than is available over most wireless channels. When tethered, the display device receives electrical power through the connections to its docking station. Depending upon the configuration of the hosting software, a tethered display device may serve a user other than the one using the locally connected display 400 or one user may use both displays in a multiple-monitor mode.

Figure 6A:
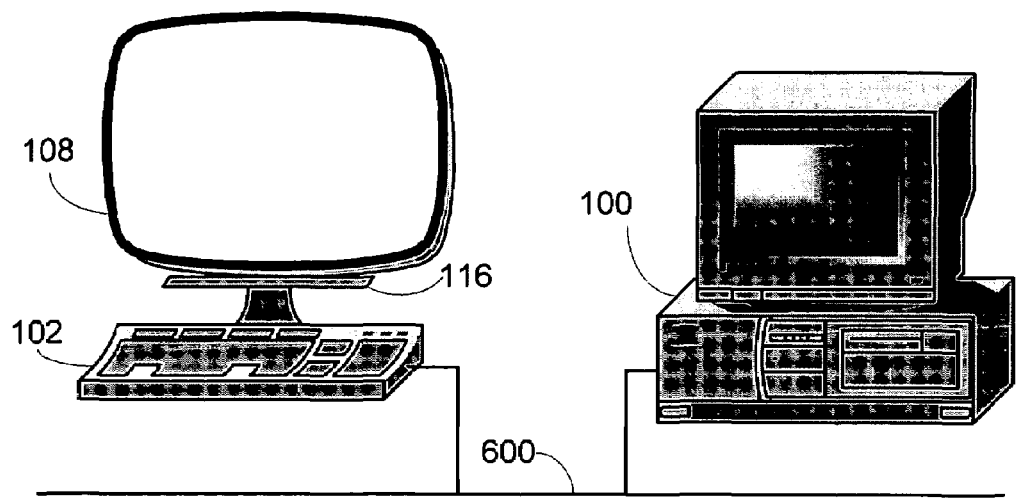
FIGS. 6A and 6B are schematic drawings showing possible embodiments of a docking station connected to the host computing device by a LAN.
Figure 6B:
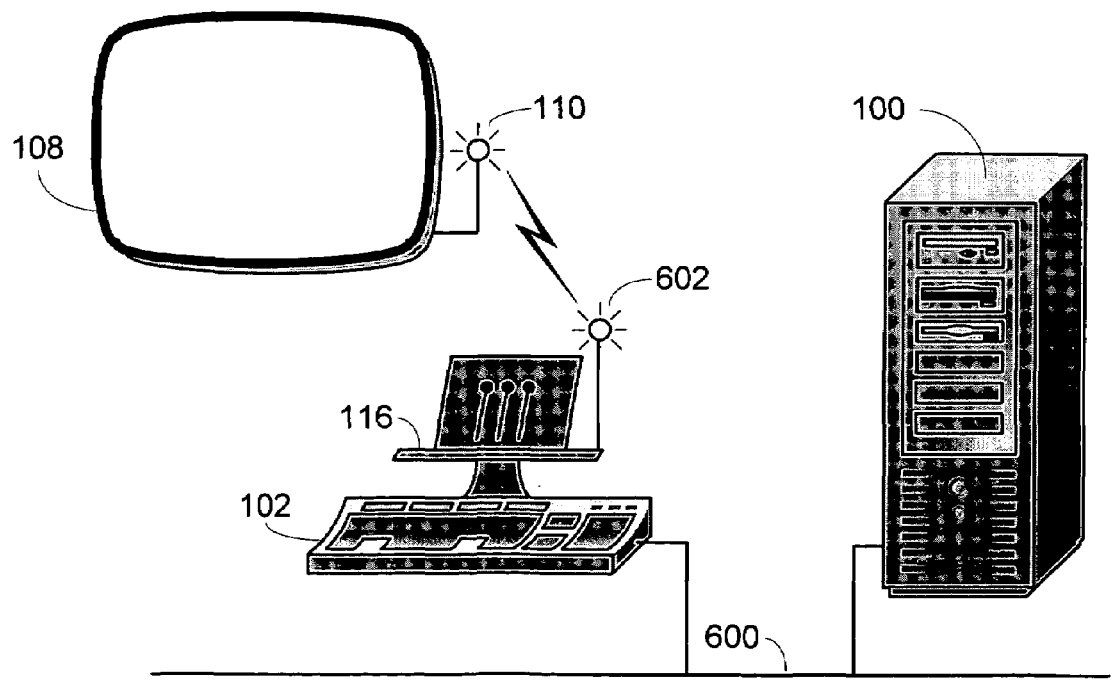

Wiring the docking station 116 directly to the host computing device 100 limits the possible distance between the host and the docking station. For those applications in which it is desirable to place the docking station at some remove from the host, the direct wired communications channel 106 is replaced with a remote connection, such as the LAN 600 illustrated in FIGS. 6A and 6B. In these embodiments, the docking station receives power from a wall outlet. The LAN carries information between the host and peripherals either directly connected to the docking station, such as the keyboard 102, or connected to the display device, such as the camera 402. Replacing the LAN with a WAN (e.g., Internet) connection allows the docking station to be even farther removed from the host, potentially on a different continent. When the docking station is remotely connected to the host, the display device shown in FIG. 6B communicates wirelessly with the docking station via antenna 602 rather than directly with the host. In this case, when the display device operates in the untethered mode, its connection with the host flows over both a wireless channel to the docking station and over the docking station's connection to the host.

Altering the User Interface Between Tethered-Optimal and Untethered-Optimal Modes A user may be happy with a pen 114 whenever the portable, interactive display device 108 is untethered but may prefer the keyboard 102 and mouse 104 when they become available, that is, when the display device is in the docking station 116. The same user may be happy with a ten-point default font size when the display device is docked but may prefer a larger size when the device is untethered and subject to movement. There is no one set of interface parameters optimal for use in both the tethered and untethered environments. Because the display device moves between these two environments, it changes its interface parameters to suit its operating environment and to suit the particular peripherals in use. As an example of changing the parameters to suit the peripherals, consider that a pen is generally not as accurate a pointing device as a mouse. A movement of a couple of pixels may be unintentional. Thus, two clicks in rapid succession, the second a couple of pixels away from the first, is interpreted as a double click for a pen but not for a mouse. Also, a pen and the hand holding it obscure part of the display screen. Because of this, pop-up menus should appear above the selection and away from the user's pen-wielding hand. By managing these parameter changes itself, the display device shields their details from the host computing device. Changes in interface parameters are also shielded from the application programs by having the operating system manage the changes.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A method for a computing device with a local display screen to communicate with a portable display system, the portable display system dockable in a docking station of the computing device, the method comprising:
   detecting whether the portable display system is in contact with the docking station; and
   if the portable computing system is in contact with the docking station, sending display signals to the portable display system and to the local display screen treating them as a multiple monitor system;
   else turning off output to the local display screen.

2. A computer-readable medium having instructions for performing the method of claim 1.

3. A method for a portable display system, dockable in a docking station, to set parameters of its display, the method comprising:
   detecting whether the portable display system is in contact with the docking station; and
   if the portable display system is in contact with the docking station, then setting the display parameters to a predefined set of parameters optimized for a particular type of input;
   else setting the display parameters to a predefined set of parameters optimized for pen input.

4. A computer-readable medium having instructions for performing the method of claim 3.

5. The method of claim 3 wherein the is particular type of input is one of a mouse, pen and human touch.

\* \* \* \* \*